United States Patent
Aoki et al.

(10) Patent No.: US 6,456,028 B2
(45) Date of Patent: Sep. 24, 2002

(54) PULSE GENERATING CIRCUIT FOR DRIVING DC MOTOR

(75) Inventors: Koji Aoki, Aichi-ken (JP); Hideyuki Kanie, Aichi-ken (JP); Hitoshi Ishikawa, Aichi-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/865,670

(22) Filed: May 29, 2001

(30) Foreign Application Priority Data

May 30, 2000 (JP) .......................... 2000-161277
Apr. 19, 2001 (JP) .......................... 2001-121648

(51) Int. Cl.$^7$ ............................................... G05B 5/00
(52) U.S. Cl. .................. 318/470; 318/439; 318/254; 318/138; 388/806; 388/800; 388/814
(58) Field of Search ................... 318/470, 439, 318/254, 138; 388/802, 806, 814

(56) References Cited

U.S. PATENT DOCUMENTS

| | | | |
|---|---|---|---|
| 4,463,426 A | | 7/1984 | Caddick et al. |
| 5,481,166 A | * | 1/1996 | Moreira ........................ 318/254 |
| 5,494,326 A | | 2/1996 | Hinds |
| 5,781,423 A | * | 7/1998 | Inarida et al. ............... 318/811 |
| 5,881,328 A | * | 3/1999 | Mizumoto .................... 318/254 |
| 6,172,463 B1 | | 1/2001 | Cutler et al. |
| 6,172,473 B1 | | 1/2001 | Oka et al. |

FOREIGN PATENT DOCUMENTS

| | | |
|---|---|---|
| JP | H06-173526 | 6/1994 |
| JP | H08-47293 | 2/1996 |
| JP | 2000-114962 | 4/2000 |
| JP | 2000-116168 | 4/2000 |
| JP | 5000-134985 | 5/2000 |

* cited by examiner

Primary Examiner—Karen Masih
(74) Attorney, Agent, or Firm—Sughrue Mion, PLLC (57) ABSTRACT

A pulse generating circuit for motor rotation of a direct current motor which is capable of pulse generation following the variation of the motor rotation condition and of stable ripple pulse generation. The pulse generating circuit for motor rotation includes a filter for varying a cut-off frequency fc by the signal from outside and for removing the noise based on the input signal from the direct current motor, a pulse forming circuit for forming the ripple pulse in accordance with the motor rotation of the direct current motor based on the output from the filter, a clock generating circuit for varying the cut-off frequency fc of the filter by providing the clock signal fCLK which is generated based on the rotational condition signal of the ripple pulse and the direct current motor to the filter, and a pulse correction circuit for generating the corrected ripple pulse when the frequency ratio between the ripple pulse and the clock signal fCLK is deviated.

5 Claims, 5 Drawing Sheets

(a) switched capacitor circuit (b)

$$fc = \frac{1}{2 \times RC_1}$$

cut-off frequency
$$fc = \frac{1}{2\pi \cdot \frac{1}{fC_2} \cdot C_3} = \frac{fC_2}{2\pi C_3}$$

PULSE GENERATING CIRCUIT FOR DRIVING DC MOTOR

This application is based on and claims priority under 35 U.S.C. § 119 with respect to Japanese Patent Application Nos. 2000-161277 and 2001-121648, the entire content of which is incorporated herein by reference.

FIELD OF THE INVENTION

The present invention generally relates to pulse generating circuit for motor rotations. More particularly, the present invention pertains to a pulse generating circuit for motor rotation generating pulse in accordance with the rotation number of a direct current motor having brushes. The pulse generating circuit for motor rotation of the present invention is applied as a detecting means for detecting the position of a movable member for performing the positional control or avoiding a dangerous contact with the movable member of the movable members such as seats for vehicles, window regulators, and sunroofs.

BACKGROUND OF THE INVENTION

U.S. Pat. No. 5,497,326 and U.S. Pat. No. 4,463,426 disclose pulse generating circuit for motor rotations of this kind applied to the position adjusting controller for vehicle seat.

The pulse generating circuit for motor rotations applied to the position adjusting controller for vehicle seat in the aforementioned publications include a pulse forming means for forming ripple component included in drive electric current driving a direct current motor (hereinafter called motor) into a pulse mode and thus for outputting the ripple pulse. The ripple pulse outputted from the pulse forming means is counted following a control program of a microcomputer. Based on the counted value, the position of the seat moved by the motor rotation is calculated by the microcomputer. The micro computer memorizes the calculated seat position. The motor rotation is controlled to automatically move the seat to the memorized position by the switching operation by occupants.

The microcomputer of the positional adjusting controller for vehicle seat disclosed in U.S. Pat. No. 5,497,326 structures a control program for comparing current interval of the ripple pulse (hereinafter called pulse interval) and average interval of previous ripple pulses (hereinafter called average pulse interval) and for performing the ripple pulse correction when the pulse interval is greater than 150% of the average pulse interval. According to the ripple pulse correction based on the control program, when the ripple pulse is not outputted when expected (hereinafter called pulse error), skipped ripple pulse is supplemented by superimposing a pulse to correct the pulse error.

Thus, the ripple pulse accurately compliant with the rotation number of the motor can be obtained to enable to calculate the position of the seat accurately by the microcomputer.

The pulse interval of the ripple pulse becomes greater than 150% of the average pulse interval when the pulse error occurs due to change with time of the motor (i.e., wear of the sliding surface between brushes and commutators, which are components of the motor, by the motor rotation). However, the pulse interval of the ripple pulse also becomes greater than 150% of the average pulse interval when the pulse error does not occur, due to a sudden change of the rotational speed of the motor by the fluctuation such as sudden decrease of the drive voltage of the motor and load fluctuation such as lock of the motor.

According to the microcomputer of the positional adjusting controller for the vehicle seat shown in U.S. Pat. No. 5,497,326, the ripple pulse is corrected when the pulse interval of the ripple pulse is greater than 150% of the average pulse interval. As a result, the ripple pulse correction is performed by supplementing the pulse even when the pulse error is not generated and the ripple pulse correction is not necessary. Accordingly, the ripple pulse which has been compliant with the rotation number of the motor becomes inaccurately compliant with the rotation number of the motor, and thus the seat position cannot he accurately detected.

In light of the foregoing, a need exists for a motor rotation pulse generating circuit which addresses at least the foregoing drawbacks associated with always obtaining accurate ripple pulse in compliance with the rotation number of the motor.

SUMMARY OF THE INVENTION

In light of the foregoing, the present invention provides a pulse generating circuit for driving DC motor which includes a ripple pulse forming circuit for forming and outputting a ripple pulse from a ripple component in an electric current for driving the DC motor, a first signal generating means for outputting a first signal corresponding to a rotational number of the DC motor based on the electric current or voltage for driving the DC motor, a judging circuit for calculating a frequency ratio between the ripple pulse and the first signal and judging whether the deviation of the ratio is greater than a predetermined value compared to a predetermined fixed value, and a correcting circuit for correcting the outputted ripple pulse when the deviation of the frequency ratio is judged to be greater than the predetermined value and maintaining the outputted ripple pulse when the deviation of the ratio is judged to be equal to or less than the predetermined value.

According to the technical means mentioned above, ratio between the ripple pulse outputted from the pulse forming circuit and the signal output from the signal generating means is not changed even when the pulse interval of the ripple pulse becomes longer than the average pulse interval by the sudden change of rotational speed of the direct current motor. Accordingly, when the correction of the ripple pulse is performed by the correcting means, the sudden change of rotational speed of the direct current motor will not affect the performance and thus, the correction of the ripple pulse is performed only when the pulse error occurs. In consequence, the accurate ripple pulse complying with the rotation number of the motor can be always obtained. Since judging, correcting, and pulse forming are performed by circuits and do not depend on the control program, it is not necessary to consider load calculation, and thus the accuracy of the ripple pulse correction can be improved.

Preferably, the pulse generating circuit for driving DC motor of the present invention further includes a clock signal generating circuit for generating a clock signal based on the ripple pulse and the first signal and a filtering circuit disposed between the DC motor and the ripple pulse forming circuit for variably filtering a cut-off frequency of the ripple pulse based on the clock signal. The first signal outputting circuit inputs the first signal to the judging circuit as the clock signal.

According to the aforementioned technical means, the cut-off frequency of the filtering circuit is varied based on the clock signal generated based on the ripple pulse and the signal outputted from the signal generating means.

Accordingly, the cut-off frequency of the filtering circuit can be following the change of the rotational speed of the direct current motor, the noise of the direct current motor is removed, and the ripple pulse which accurately complies with the rotation number of the direct current motor can be generated. Since the signal from the signal generating means is outputted to the judging circuit as the clock signal, the circuit structure can be simplified.

Preferably, the judging circuit includes a first counter circuit for counting the number of pulse of the first signal and resetting the counted value by the input of the ripple pulse and for outputting a correction signal correcting the ripple pulse to the correcting circuit when the counted value exceeds a first predetermined value during the time until the resetting of the counted value.

Preferably, the pulse generating circuit for dividing DC motor includes a masking circuit disposed between the first counter circuit and the correcting circuit for masking the output of the correction signal from the first counter circuit to the correcting circuit when the ripple pulse is inputted and such inputted ripple pulse is irregular.

According to the aforementioned technical means, unstable ripple pulse at start of the direct current motor can be removed to perform accurate ripple pulse correction.

Preferably, the pulse generating circuit for driving DC motor further includes a second counter circuit for counting the number of pulse of correction signal and a defect detecting circuit for outputting a signal indicating a circuit defect when the value of the counted value of the second counter circuit exceeds a second predetermined value.

According to the foregoing technical means, the circuit defect that occurs when the feedback does not function normally by the clock signal generating means can be easily detected from the outside based on the detect indicating signal outputted from the defect detecting circuit.

BRIEF DESCRIPTION OF THE DRAWINGS

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
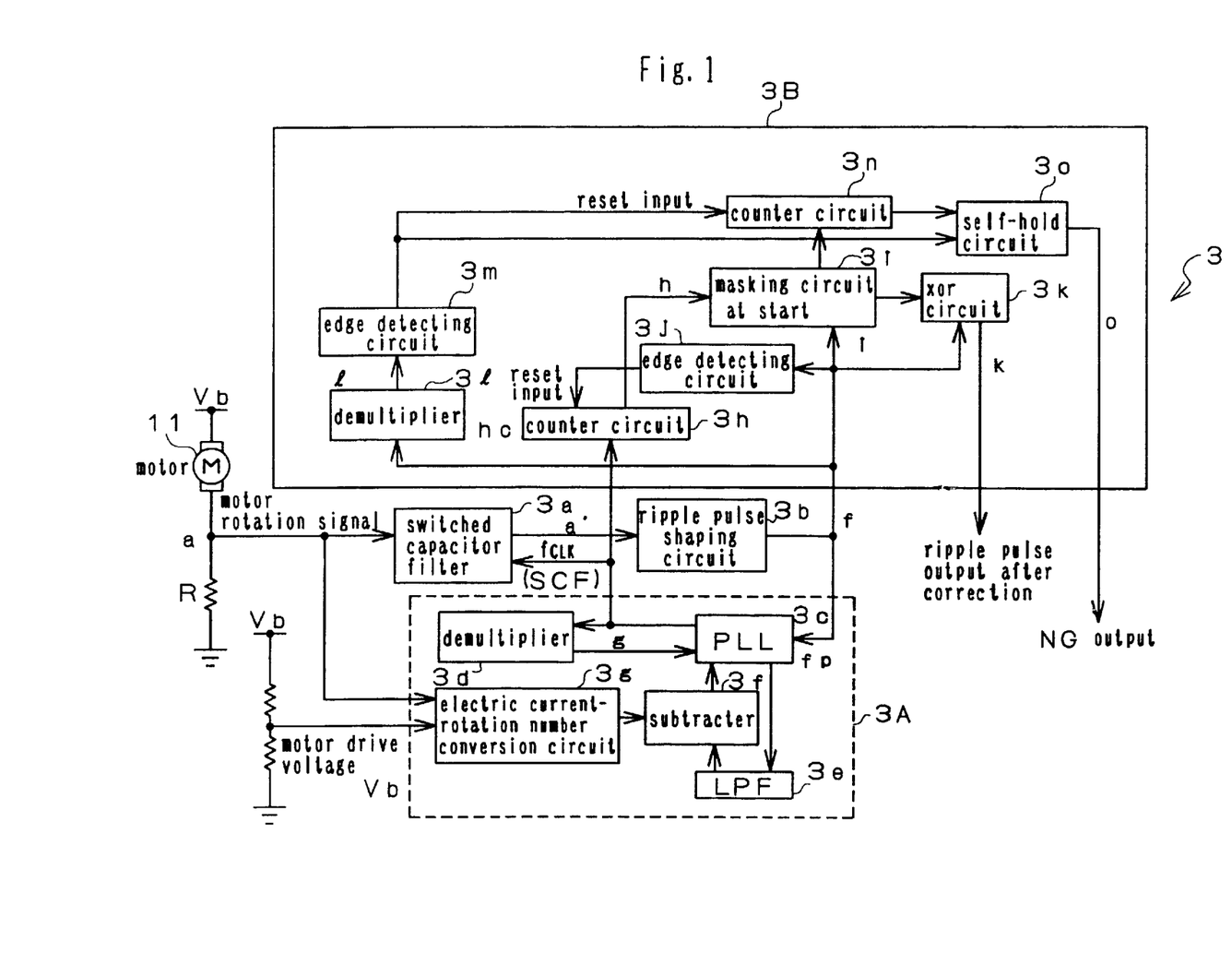
FIG. 1 is a schematic view showing a pulse generating circuit for motor rotation and a direct current motor according to an embodiment of the present invention.

Preferred embodiment of the present invention will be described hereinafter in detail with reference to the accompanying drawings. FIG. 1 shows a schematic block of a pulse generating circuit 3 for motor rotation for outputting pulses (i.e., ripple pulse) in accordance with the rotation number of a direct current motor 11. As shown in FIG. 1, the pulse generating circuit 3 for motor rotation includes a switched capacitor filter (SCF) 3a, a ripple pulse shaping circuit 3b, a pulse generating circuit 3A (3c–3g), and a pulse correction circuit 3B (3i–3o). The pulse generating circuit 3A includes a phase locked loop (PLL) 3c, a first frequency demultiplier 3d, a low-pass filter (LPF) 3e, a subtracter 3f, and an electric current-rotation number conversion circuit 3g. The pulse correction circuit 3B includes a masking circuit at start 3i, a first counter circuit 3h, a first edge detecting circuit 3j, and an exclusive OR (XOR) circuit 3k. The pulse correction circuit 3B further includes a second frequency demultiplier 3l, a second edge detecting circuit 3m, a second counter circuit 3n, and a self-hold circuit 3o, which form a defect detecting circuit. Although the defect detecting circuit is included in the pulse correction circuit 3B in the embodiment of the present invention, the defect detecting circuit can be provided separately from the pulse correction circuit 3B.

Figure 2:
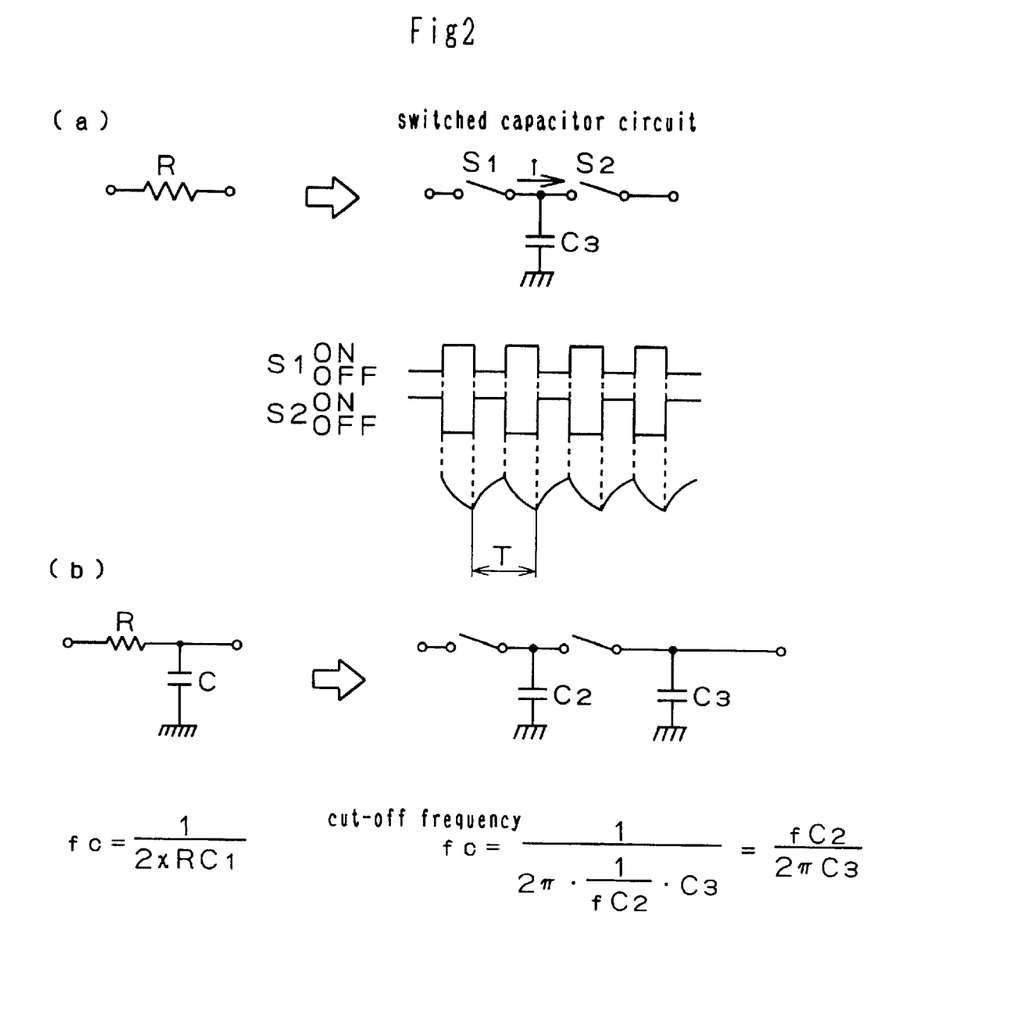
FIGS. 2(a) and 2(b) are an operation explanation of a switched capacitor filter of the pulse generating circuit for motor rotation according to a first embodiment of the present invention.

As shown in FIG. 2(a), the switched capacitor filter 3a corresponds to a filter being applied with a circuit (a switched capacitor circuit) structured with analogue switches and a capacitor. Referring to FIG. 2(a), the switched capacitor filter 3a is basically structured with two switches S1, S2 and a capacitor C3. By alternatively turning on and off the switches S1, S2 with a time period T, the electric current i is supplied under the condition $i = V/(1/fC)$. Accordingly, switched capacitor is equivalent to a resistor. When the resistor in the CR filter is replaced by the switched capacitor filter (SFC), referring to FIG. 2(b), a cut-off frequency fc of the circuit becomes variable by a frequency for turning on and off two switches S1, S2 (a clock input in case of the switched capacitor filter 3a) and thus the cut-off frequency fc is illustrated as shown in FIG. 2(b). As the switched capacitor filter, commercially available IC is used. The cut-off frequency fc is illustrated as fc=fCLK (clock input frequency) /N (i.e., a constant, e.g., constant: 50).

Figure 3:
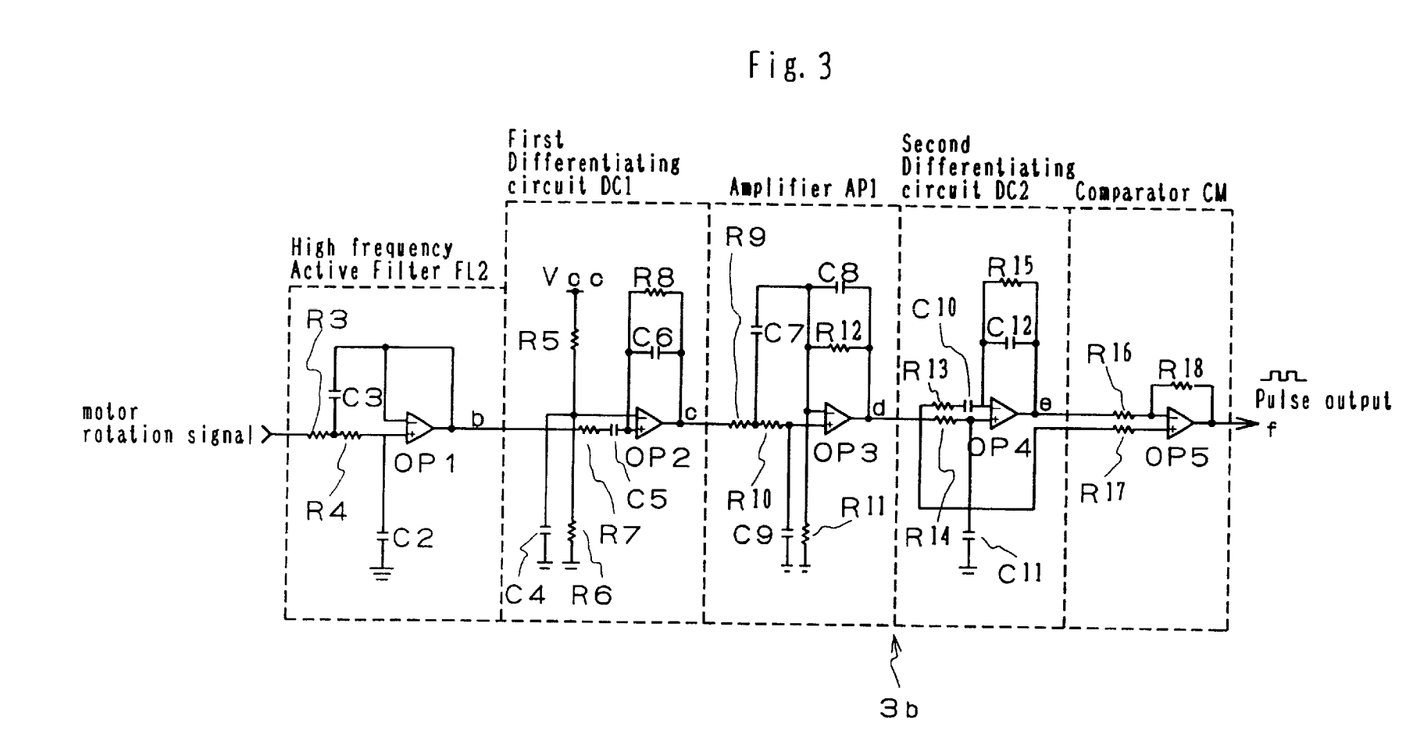
FIG. 3 is an electric circuit view of a ripple pulse generating circuit shown in FIG. 1.

The ripple pulse shaping circuit 3b has a circuit structure shown in FIG. 3. The ripple pulse shaping circuit 3b includes a high frequency active filter FL2, first and second differentiating circuits DC1, DC2, an amplifier AP1, and a comparator (a voltage comparator) CM.

The high frequency active filter FL2 includes resistors R3, R4, capacitors C2, C3, and an operational amplifier OP1. The resistors R3, R4 are connected in series to a non-inverting input terminal of the operational amplifier OP1. The capacitor C2 is also connected to the non-inventing input terminal. The capacitor C3 is connected to the connecting point between an inverting input terminal and the resistors R3, R4 thus to provide the feedback to the output. The high frequency active filter FL2 removes the high frequency component. For example, the noise component greater than the maximum rotation number of the direct current motor 11 (e.g., 6000 rpm) can be effectively damped. The high frequency active filter FL2 functions as a low-pass filter which can remove the noise mixed in the rotation signal (ripple frequency) of the direct current motor.

The first differentiating circuit DC1 connected to an output (b) of the high frequency active filter FL2 differentiates input signal thus to reduce the direct current component. In the first differentiating circuit DC1, a resistor R7 and a coupling capacitor C5 are connected in series to the non-inverting input terminal of an operational amplifier OP2. A divided voltage of a resistor R5 and a resistor R6 is added to the inverting input terminal. A bypass capacitor C4 is connected to a divided point of the resistors R5, R6. A resistor R8 and a capacitor C6 are connected in parallel between the operational amplifier OP2 and the non-inverting input terminal.

An amplifier AP1 amplifies an output (c) from the first differentiating circuit DC1. In the amplifier AP1, resistors R9, R10 are connected in series to the non-inverting input terminal of an operational amplifier OP3. A capacitor C9 is also connected to the non-inverting input terminal. A capacitor C7 is connected to a connecting point between the resistors R9, R10 and inverting input terminal. The capacitor C7 is grounded via a resistor R11. A capacitor C8 and a resistor 12 are connected in parallel between the inverting input terminal of the operational amplifier OP3 and an output (d).

A second differentiating circuit DC2 differentiates the output (d) of the amplifier AP1 to shift the phase by 90 degrees. The output (d) of the amplifier AP1 is connected to the non-inverting input terminal of an operational amplifier OP4 via a resistor R14 and a capacitor C11. A resistor R13 and a capacitor C10 are connected in series to the inverting input terminal. A resistor R15 and a capacitor C12 are connected between an output (e) of the operational amplifier OP4 and the inverting input terminal.

The output (e) from the second differentiating circuit DC2 and the output (d) from the amplifier AP1 are compared by a comparator CM. In the comparator CM, the output (d) of the amplifier AP1 is connected to the inverting input terminal of an operational amplifier OP5 via a resistor R17. The output (e) from the second differentiating circuit DC2 is connected to non-inverting input terminal via a resistor 16. A resistor R18 is connected between an output (f) of the operational amplifier OP5 and the resistor 16. A rectangular pulse output (ripple pulse) corresponding to the ripple frequency is outputted from the output (f). The pulse output (f) is inputted into a CPU2 of a controller 1.

Figure 4:
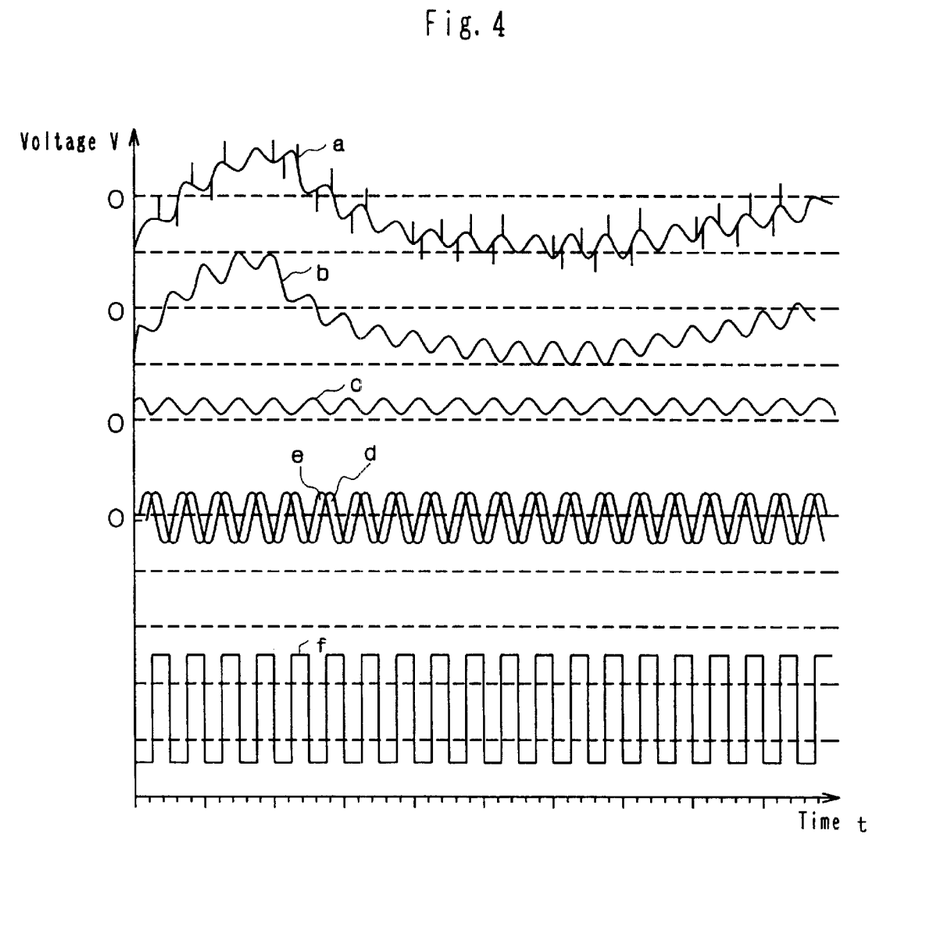
FIG. 4 is a time chart showing wave forms of respective points of the pulse generating circuit shown in FIG. 3.

Referring to FIG. 4, the output wave form of respective points of the ripple pulse shaping circuit 3b will be explained as follows. The electric current in the direct current motor 11 shown in FIG. 1 is converted into a voltage signal (motor rotation signal) being proportional to the electric current. The voltage signal includes noise and ripple typical for direct current motors (i.e., wave form "a"). The ripple is generated when the direct current motor 11 is used. The number of the coils connected to the commutators is varied in accordance with the rotation of the motor when a plurality of commutator segments are passing through brushes. Accordingly, the number of coils connected in parallel is varied and the electric current supplied in the coil is varied by the variation of the resistance value during the motor rotation, and thus the ripple is generated.

The signal having ripple is defined as ripple pulse in this embodiment. By filtering the ripple pulse through the switched capacitor filter (SCF) 3a, the ripple noise is removed. Instead, the noise derived from a clock input (i.e., clock frequency fCLK) of the switched capacitor filter 3a appears in the output. By filtering the output signal through the low-pass filter LPF, the wave form "a" becomes flatter and damped thus to remove the noise component from the wave form "a", which is shown as wave form "b". By filtering the signal filtered through the low-pass filter LPF (wave form "b") through the first differentiating circuit CD1, the signal is differentiated and the direct current component is reduced to leave only the ripple component in the wave form, that is a wave form "c". By filtering the wave form "c" through the amplifier AP1, the amplitude of the wave form "c" is increased to form a wave form "d" and the wave form is changed to a wave form "e" after filtering through the second differentiating circuit DC2. The phase of the wave form "e" is retarded by 90 degrees from the wave form "c". Finally, by comparing the output (wave form "d") of the amplifier AP1 and the output (wave form "e") of the second differentiating circuit DC2 using the comparator CM, the pulse output (wave form "f") is obtained.

In the embodiment of the present invention, the wave form of the pulse output (ripple pulse) is provided as a feedback and the frequency of the ripple pulse becomes the cut-off frequency fc of the switched capacitor filter 3a. That is, PLL 3c outputs the frequency which becomes the optimum cut-off frequency (e.g., 60 fp) based on the constant N (=50) of the equation (i.e., fc=fCLK/N) showing the cut-off frequency of the output from the switched capacitor filter 3a relative to the frequency fp of the ripple pulse (wave form "f") inputted into the PLL3c. The output (frequency 60 fp) from the PLL 3c is divided by sixty by the first frequency demultiplier 3d relative to the input frequency fp. The first frequency demultiplier 3d outputs the frequency fp to the PLL 3c. The oscillation in the phase locked loop is controlled so that the optimum cut-off frequency fc can be obtained based on the frequency fp of the ripple pulse inputted into the PLL 3c to control the phase of the output signal of the first frequency demultiplier 3d. Accordingly, the cut-off frequency fc of the switched capacitor filter 3a is linearly changed based on the condition of the pulse output (ripple pulse) of the direct current motor 11.

In order to stabilize the output from the PLL 3c at start of the pulse generating circuit 3A, the PLL 3c includes the LPF 3e, the subtracter 3f, and the electric current-rotation number conversion circuit 3g. The motor drive voltage Vb actually driving the direct current motor 11 is varied by the battery voltage at start of the pulse generating circuit 3A. However, in the structure of this embodiment, by providing the motor rotation signal and the motor drive voltage Vd as external signals to the subtractor 3f and filtering the signals through the electric current-rotation number conversion circuit 3g (that is, the motor rotation number is obtained from the motor electric current and the motor drive voltage Vb based on the relationship that the motor rotation number is decreased when the motor electric current is increased, and the motor rotation number is increased when the motor electric current is decreased), the oscillation of the PLL 3c is maintained at a constant electric voltage level at the initial condition. When the oscillation is stabilized under normal condition the oscillation is conducted depending on the ripple pulse inputted into the PLL 3c. In this structure, the frequency in accordance with the motor rotation number is obtained as fx. The clock signal corresponding to a fixed multiplied amount of the frequency fx is generated by the PLL 3c. And the frequency becomes the cut-off frequency fc. The signal of the PLL 3c to the LPF 3e is proportional to the phase difference between the ripple pulse f and the signal g from the first frequency demultiplier 3d. The phase control is conducted by adding the output g from the first frequency demultiplier 3d to the ripple pulse f.

First, the clock signal fCLK based on the motor rotation signal and the signal of the motor drive voltage is outputted from the PLL 3c at start of the motor. Second, the cut-off frequency is varied. Third, the ripple pulse based on the rotation condition of the motor is generated. Fourth, the motor electric current is stabilized. Fifth, the feedback control works when the ripple pulse is started to be generated from the ripple pulse shaping circuit 3b. Sixth, the phase of the clock signal is controlled by the PLL circuit 3c in order to correspond with the ripple pulse (frequency: f) and the output signal from the first frequency demultiplier 3d to input the clock signal with stabilized oscillation into the switched capacitor filter 3a. The cut-off frequency fc of the switched capacitor filter 3a is linearly varied since the ripple pulse is generated under the condition that the cut-off frequency is varied based on the rotation condition of the motor after start of the motor.

In the structure of FIG. 1, by providing the feedback of the pulse output (ripple pulse) and by linearly varying the cut-off frequency fc of the switched capacitor filter 3a based on the ripple pulse frequency, the pulse output (wave form "f") is accurately switched in order to vary the cut-off frequency in accordance with the frequency of the pulse where the error components are not included relative to the current wave with ripple pulse. Thus, stable wave form without error component can be obtained. The position control of the motor rotation is controlled based on the accurate ripple pulse synchronizing to the motor rotation achieved in the foregoing manner. First, the ripple pulse is inputted into an input terminal of a controller. By performing the position control at a time of ripple pulse switching (in this case, detecting falling edge), the position control of the direct current motor 11 is accurately performed. The pulse generating circuit 3 for motor rotation of the foregoing structure is applicable for example, to a vehicle memory seat system which performs accurate pulse output by synchronizing the rotation of the direct current motor 11.

However, in general, even when the accurate ripple pulse is generated in accordance with the motor rotation, by change with time the sliding surface of the brush of the motor 11 is worn out by the friction between the brush and the commutator due to the motor rotation. The desired ripple pulse is not generated due to the wear, thus the pulse error is generated. Hence, in order to prevent the pulse error due to the change with time, a pulse correction circuit 3B is provided.

The structure of the pulse correction circuit 3B will be explained as follows. The pulse correction circuit 3B always (e.g., even when the motor electric current is sharply changed due to load fluctuation such as motor locking and even when the ripple pulse is skipped) performs the pulse correction to make the constant ratio between the ripple pulse and the clock frequency fCLK.

Figure 5:
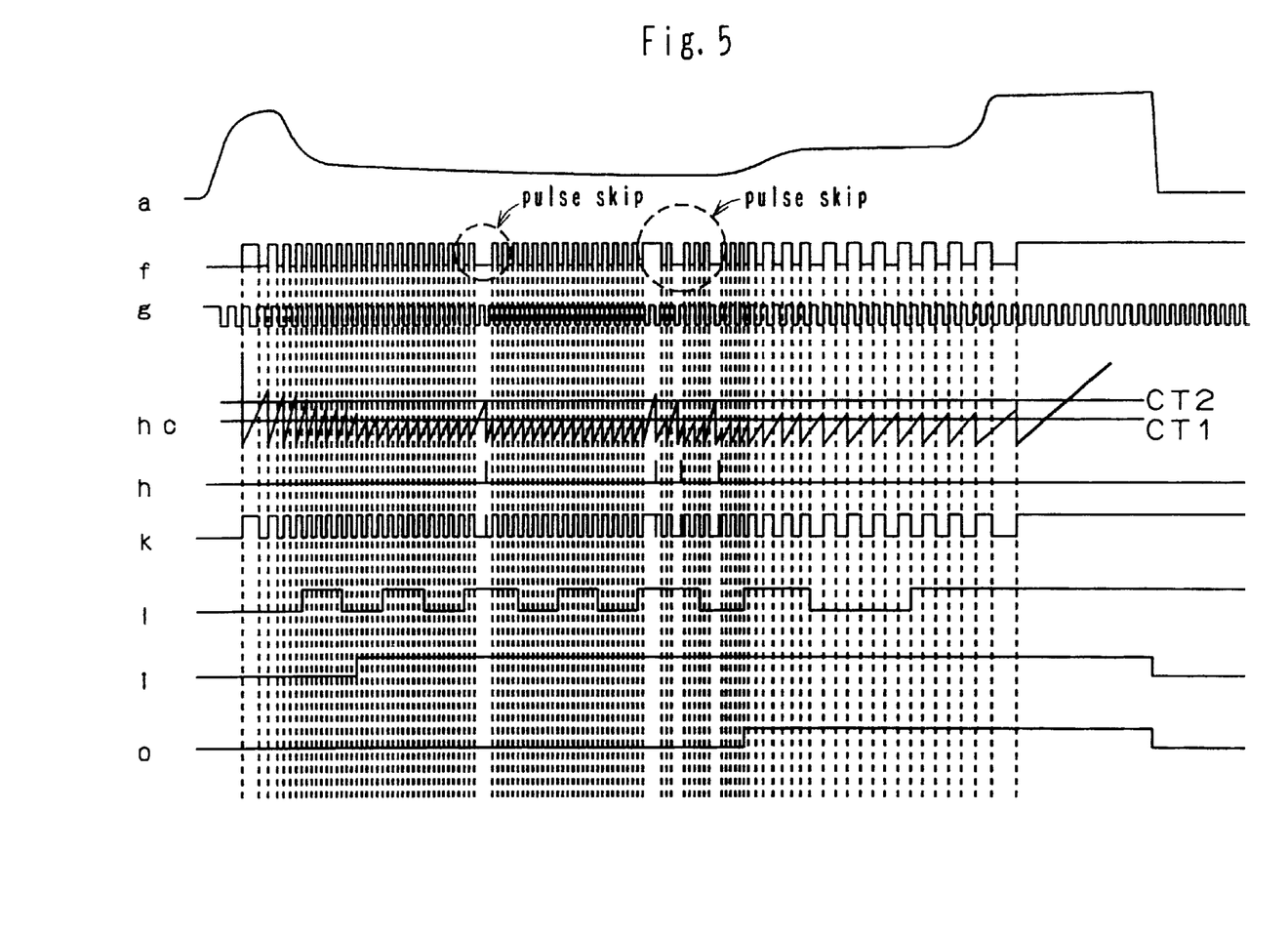
FIG. 5 is a time chart showing wave forms of respective points of the pulse generating circuit shown in FIG. 1.

The clock signal fCLK from the PLL3c is inputted into the switched capacitor filter 3a and is simultaneously inputted into the first counter circuit 3h. In the first counter circuit 3h, the number of the rising edge of the clock signal is counted. A rising edge of the ripple pulse generated in the ripple pulse shaping circuit 3b is detected by an edge detecting circuit 3j. A reset signal is outputted from the edge detecting circuit 3j to the first counter circuit 3h every time when the edge of the ripple pulse is inputted into the edge detecting circuit 3j. That is, the counter circuit 3h counts the ripple pulse (frequency: f) by counting the fCLK/60 (wave form "g") which is synchronized to the ripple pulse. The counter circuit 3h is reset when 60 pulse is counted-up. When counter value (i.e., hc of FIG. 5) reaches a predetermined value CT1, pulse output corresponding to one pulse is outputted front the counter circuit 3h (wave form "h").

The output signal (wave form "h") from the counter circuit 3h is inputted into a masking circuit at start 3i. The ripple pulse generated in the ripple pulse shaping circuit 3b is inputted into the masking circuit 3i at start. The masking functions not to output the signal from the masking circuit 3i until a predetermined number of ripple pulse is inputted at start (i.e., the period until the ripple pulse is stabled after the transitional change after start. e.g., 50 pulse). During the masking, the signal is not outputted until the ripple pulse is inputted by 50 pulse in the masking circuit 3i. After the masking, the counter output (wave form "h") from the counter circuit 3h is outputted from the masking circuit 3i. The output from the masking circuit at start 3i is inputted into an exclusive OR circuit 3k. The ripple pulse is inputted into the exclusive OR circuit 3k. After the ripple pulse is inputted by 50 pulse, the corrected ripple pulse is outputted (wave form k). Normally, the counter value of the counter circuit 3h does not exceed the predetermined value CT1 (e.g., 60 count) since the frequency ratio between the ripple pulse and the clock signal is defined as 60:1. However, when the pulse error is generated in the ripple pulse outputted from the ripple pulse shaping circuit 3b due to the change with time, the counter value exceeds the predetermined value CT1 (60 count). By providing a threshold value for judging the skip of pulse as a predetermined value CT2 (e.g., 100 count) irrespective of the ripple frequency, the pulse (wave form "h") is outputted from the counter circuit 3h when the pulse count value exceeds CT2. During the masking period (i.e., before the ripple pulse is inputted by 50 pulse and having the wave form i and with low output) the correction of the ripple pulse is not performed since the ratio between the ripple pulse and the clock signal FCLK is unstable. After the masking period when the pulse skip is generated during the pulse output is stabilized (i.e., having wave form i and high output) (referring to FIG. 5), the correction of the ripple pulse is performed by superimposing one pulse at time of the generation of the pulse skip in the exclusive circuit 3k.

As shown in FIG. 1, the pulse correction circuit 3B includes the defect detecting circuit having a second demultiplier 3l, the second edge detecting circuit 3m, the second counter circuit 3n, and the self-hold circuit 3c in this embodiment. The defect detecting circuit functions as follows. The ripple pulse is divided by eight by the second demultiplier 31 (wave form 1). The rising edge of the demultiplied ripple pulse is detected by the edge detecting circuit 3m. The detected rising edge of the ripple pulse outputted into the second counter circuit 3n and the self-hold circuit 3c. The counter of the counter circuit 3n is reset by an output signal from the edge detecting circuit 3m. The second counter circuit 3n counts the number of counter pulse output from the first counter circuit 3h inputted thereinto during the ripple pulse divided by eight through the demultiplier 31 is counted having eight times as one cycle. When the counter pulse necessary for the pulse correction is inputted more than a predetermined pulse (e.g., 3 pulse) under this condition, NG signal showing the irregularity of the circuit is outputted. Because it is judged that the number of pulse correction within a predetermined period is excessively frequent. By always observing the NG signal from outside, it can be judged whether the feedback loop is adequately functioning to judge the circuit defect.

In this embodiment of the present invention, the filter cut-off frequency fc is determined by the motor drive voltage Vb, motor electric current, and the feedback of the ripple pulse. The filter cut-off frequency fc can be followed with good response to the motor drive voltage Vb and the motor electric current. The cut-off frequency fc can be feedback slowly by the feedback of the ripple pulse. Accordingly, the filter cut-off frequency fc immediately follows the sudden change of the motor drive voltage Vb and the motor electric current and thus the ratio between the ripple pulse and the clock signal is fixed to 1:60. When the ripple pulse is not inputted irrespective of the motor drive voltage Vb and the motor electric current, the feedback is not immediately performed to the skipped ripple pulse. This changes the frequency ratio between the ripple pulse and the clock signal out of 1:60, thus the pulse correction for the skipped pulse is performed.

Although the rising edge is detected in the edge detecting circuits 3j, 3m in this embodiment, falling edge may be detected. The frequency ratio between the ripple pulse and the clock signal is not limited to 1:60.

What is claimed is:

1. A pulse generating circuit for driving a DC motor, comprising:
   a ripple pulse forming circuit for forming and outputting a ripple pulse from a ripple component in an electric current for driving the DC motor;
   a first signal generating means for outputting a first signal corresponding to a rotational number of the DC motor based on the electric current for driving the DC motor or on a voltage for driving the DC motor;
   a judging circuit for calculating a frequency ratio between the ripple pulse and the first signal and judging whether a deviation of the frequency ratio is greater than a predetermined value compared to a predetermined fixed value; and
   a correcting circuit for correcting the outputted ripple pulse when the deviation of the frequency ratio is judged to be greater than the predetermined value and maintaining the outputted ripple pulse when the deviation of the ratio is judged to be equal to or less than the predetermined value.

2. The pulse generating circuit according to claim 1 further comprising:
   a clock signal generating circuit for generating a clock signal based on the ripple pulse and the first signal; and
   a filtering circuit disposed between the DC motor and the ripple pulse forming circuit for variably filtering a cut-off frequency of the ripple pulse based on the clock signal, wherein the first signal outputting circuit inputs the first signal to the judging circuit as the clock signal.

3. The pulse generating circuit according to claim 1, wherein the judging circuit comprises a first counter circuit for counting a number of pulse of the first signal and resetting the counted value by an input of the ripple pulse and for outputting a correction signal correcting the ripple pulse to the correcting circuit when the counted value exceeds a first predetermined value during a time until the resetting of the counted value.

4. The pulse generating circuit according to claim 3 further comprising a masking circuit disposed between the first counter circuit and the correcting circuit for masking the output of the correction signal from the first counter circuit to the correcting circuit when the ripple pulse is inputted and the inputted ripple pulse is irregular.

5. The pulse generating circuit according to claim 4 further comprising:
   a second counter circuit for counting a number of pulse of correction signal; and
   a defect detecting circuit for outputting a signal indicating a circuit defect when the value counted by the second counter circuit exceeds a second predetermined value.

* * * * *